United States Patent
Ou-Young (10) Patent No.: US 6,321,642 B1
(45) Date of Patent: Nov. 27, 2001

(54) FILLING MECHANISM FOR FOOD STUFFING

(76) Inventor: Robert Ou-Young, 5F, No. 52, Lane 148, Li-De St., Chung Ho City, Taipei Hsine (TW)

( * ) Notice: Subject to any disclaimer, the term of this patent is extended or adjusted under 35 U.S.C. 154(b) by 0 days.

(21) Appl. No.: 09/903,139

(22) Filed: Jul. 10, 2001

(51) Int. Cl.⁷ .............. A23L 1/00; A22C 11/02; A23P 1/00

(52) U.S. Cl. .......... 99/494; 99/450.1; 99/450.6; 99/450.7; 452/42; 452/45

(58) Field of Search ........ 99/494, 450.1–450.8, 99/485, 516; 425/133.1; 452/42, 45, 88

(56) References Cited

U.S. PATENT DOCUMENTS

| | | | |
|---|---|---|---|
| 2,568,491 | * 9/1951 | Edwards et al. | 452/45 X |
| 4,102,257 | * 7/1978 | Gonzalez | 99/494 |
| 4,160,634 | * 7/1979 | Huang | 99/450.6 X |
| 4,207,281 | * 6/1980 | Bernard | 99/483 X |
| 4,697,505 | * 10/1987 | Brewer et al. | 99/450.1 |
| 4,700,899 | * 10/1987 | Powers et al. | 99/472 X |
| 4,703,688 | * 11/1987 | Ochs | 99/450.8 |
| 4,949,430 | * 8/1990 | Stanek | 99/494 |
| 4,958,412 | * 9/1990 | Stanek | 99/494 |
| 4,989,505 | * 2/1991 | Mally | 99/483 |
| 5,083,507 | * 1/1992 | Van Haren | 99/472 |
| 5,673,612 | * 10/1997 | Svendsen | 99/450.7 |
| 6,117,467 | * 9/2000 | Huling | 99/450.7 X |

* cited by examiner

*Primary Examiner*—Timothy F. Simone
(74) *Attorney, Agent, or Firm*—Pro-Techtor International Services (57) ABSTRACT

A filling mechanism which does not dehydrate or deoil the stuffing, comprises a main frame on which is mounted a hopper and a hose, the hopper guiding the stuffing into the hose, the hose having a front end positioning part that is tightly fixed; a pushing device for guiding and pushing the stuffing, the pushing device being mounted below the hose and including a transverse seat plate on the upper surface of which is disposed a slide rail, a slide seat slidably displaceable along the slide rail, a pneumatic cylinder disposed on the slide seat, and a fixing plate mounted on the upper portion of the pneumatic cylinder, the pneumatic cylinder having a piston rod which can shuttle back and forth out of the fixing plate; and a transverse roller member having two side arms by which the roller member is pivotally onto the fixing plate, whereby upon raising the piston rod and displacement of the slide seat, the roller member rolls and presses against the hose, causing the hose to be partially deformed and the stuffing in the hose to be squeezed and displaced out of the hose.

6 Claims, 7 Drawing Sheets

FILLING MECHANISM FOR FOOD STUFFING

BACKGROUND OF THE INVENTION

1. Field of the Invention

The present invention relates to a filling mechanism for food stuffing which issues the stuffing out without dehydrating (deoiling) it.

2. Description of the Related Art

The typical structure of the foodstuff mechanism known in the art, such as the improved filling structure of a forming mechanism for wheathen (noodle-type) food in Taiwanese patent publication no. 234258, consists of a spiral guide device inserted into a guide pipe for the stuffing. The stuffing advances in the guide pipe primarily by the rotation of the guide device with spiral blades so that the stuffing move forwardly and out of the guide pipe. The drawbacks thereof are as follows:

(1) The stuffing may be composed of a mixture of vegetables and meat. The guide device has spiral blades which, during rotation and in particular when guiding the stuffing, can destroy the fibrous tissue of meat and vegetables and produce large amount of oil and water. When the stuffing is finally fed out, the mixture of meat and vegetables (i.e., the output stuffing) are in dried form (dehydrated or deoiled). Thus, when such dehydrated, deoiled stuffing is used in stuffed food such as dumplings and stuffed buns . . . etc., the stuffing is hard and dry and tasteless, and a world of difference from hand-made stuffing can be noted.

(2) The delivery of stuffing is made by rotation and guiding of the stuffing by the guide device, the speed of which is slow and cannot guide the stuffing rapidly. Thus, the rate of filling of the stuffing is slow.

In view of the foregoing, the subject of the present invention is a filling mechanism which can feed out without dehydrating (deoiling) the stuffing.

SUMMARY OF THE INVENTION

Accordingly, a main object of the present invention is to provide a filling mechanism which feeds out without dehydrating (deoiling) the stuffing, such that in the process of guiding the stuffing, the fibrous tissues of the meat and vegetables are not overly destroyed thereby obtaining an outputted stuffing which still has a considerable amount of water and oil.

Another object of the present invention is to provide a filling mechanism which feeds out without dehydrating (deoiling) the stuffing, which improves on the stuffing output rate and where the amount of stuffing output can be effectively and rapidly controlled.

To realize the above objects, the present invention provides a filling mechanism which does not dehydrate or deoil the stuffing, comprising:

a main frame on which is mounted a hopper and a hose, said hopper guiding the stuffing into said hose, said hose having a front end positioning part that is tightly fixed;

a pushing device for guiding and pushing the stuffing, said pushing device being mounted below said hose and including a transverse seat plate on the upper surface of which is disposed a slide rail, a slide seat slidably displaceable along said slide rail, a pneumatic cylinder disposed on said slide seat, and a fixing plate mounted on the upper portion of said pneumatic cylinder, said pneumatic cylinder having a piston rod which can shuttle back and forth out of said fixing plate; and a transverse roller member having two side arms by which the roller member is pivotally onto said fixing plate, whereby upon raising said piston rod and displacement of said slide seat, said roller member rolls and presses against said hose, causing said hose to be partially deformed and the stuffing in said hose to be squeezed and displaced out of said hose.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
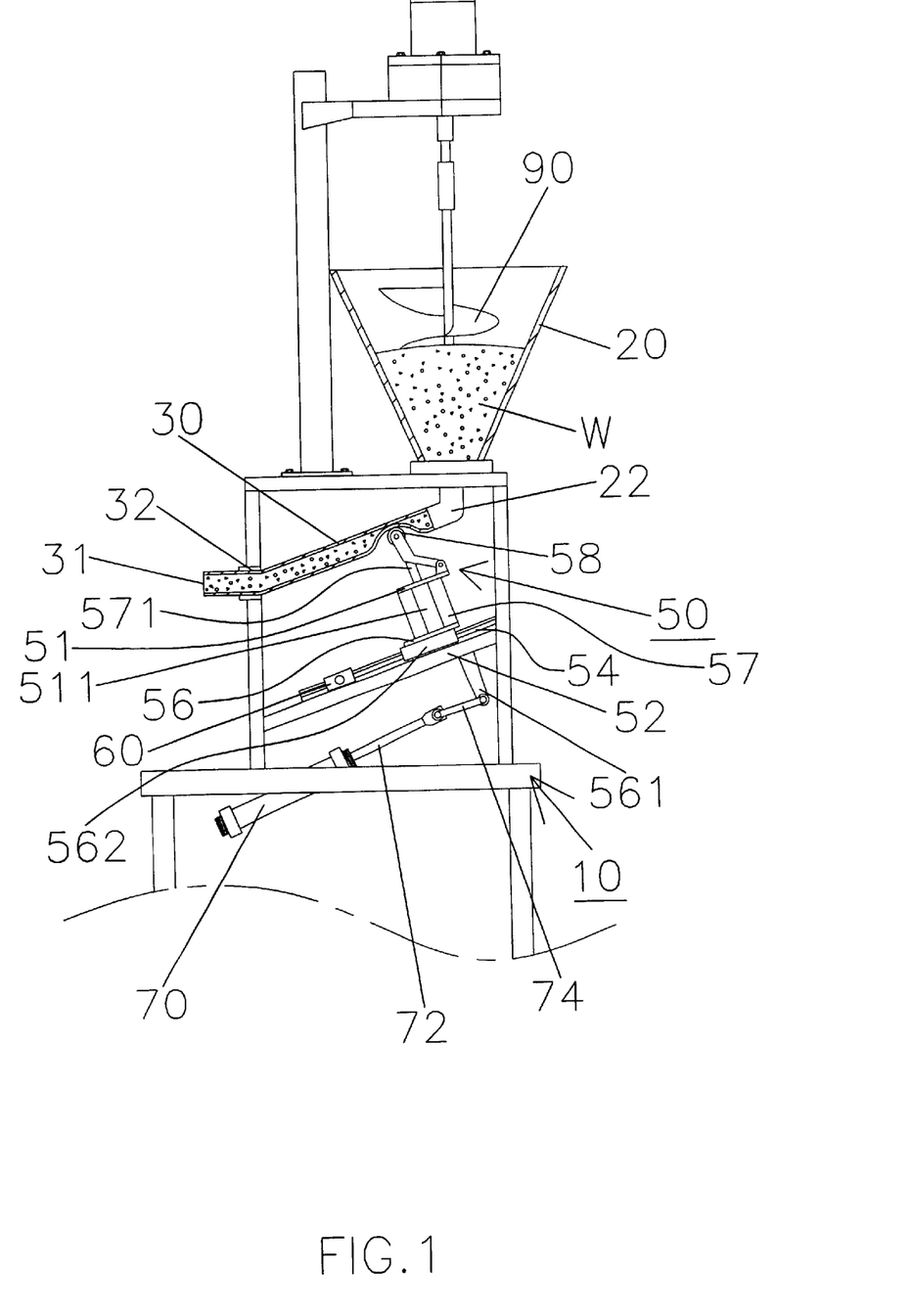
FIG. 1 is a sectional view of the present invention.
Figure 2:
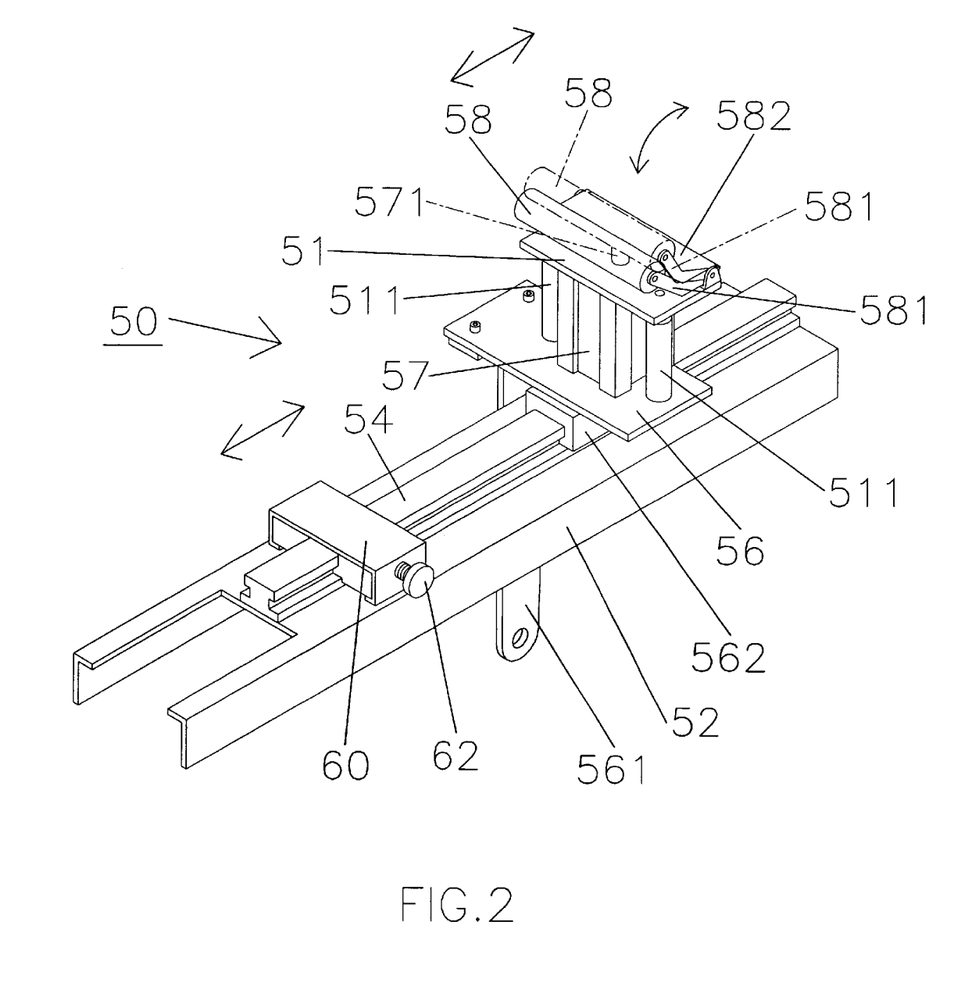
FIG. 2 is a perspective view of the pushing device of the present invention.

Referring to FIGS. 1 and 2, the present invention according to the apparatus features thereof comprises a main frame 10 on which is mounted a hopper 20 and a hose 30, the hopper 20 guiding the stuffing W into the hose 30 and the front end of the hose 30 having a positioning portion 32 being tightly fixed; a pushing device 50 for guiding and pushing the stuffing, said pushing device 50 being mounted below the feeding hose 30 and including a transverse seat plate 52 on the upper surface of which is disposed a slide rail 54, a slide seat 56 slidably displaceable along the slide rail 54, an upper pneumatic cylinder 57 disposed on the seat, and a fixing plate 51 mounted on the upper portion of the upper pneumatic cylinder 57, the pneumatic cylinder having a piston rod 571 which can be shuttled back and forth out of the fixing plate 51; a transverse roller member 58 having two side arms 581 by which the roller member 58 is pivotally onto the fixing plate 51, whereby upon raising the piston rod 571 and displacement of the slide seat 56, the roller member 58 can roll and press against the hose 30, causing the hose 30 to be partially deformed and the stuffing W in the hose 30 to be squeezed and displaced out of the hose 30.

According to the primary features described above, a distance-setting block 60 is slidably attached to the rear section of the slide rail 54. Through the threaded connection and positioning of a bolt 62, the block 60 is threadedly fixed on the slide seat 54 with adjustable distance, to thereby control or restrict the distance of travel of the slide seat 56.

Figure 4:
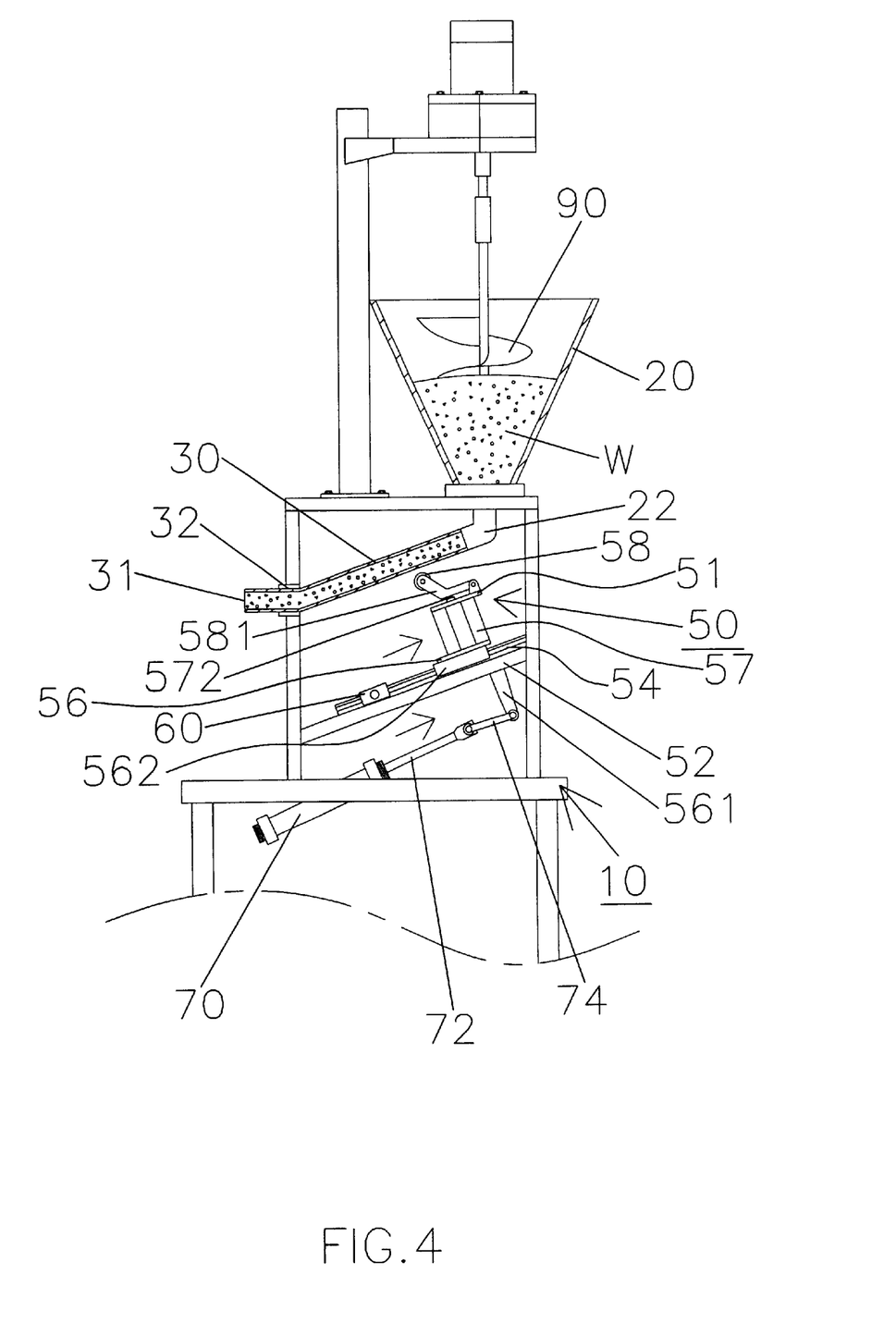
FIG. 4 is an operational view (A) showing the displacement of the pushing device of the present invention.
Figure 5:
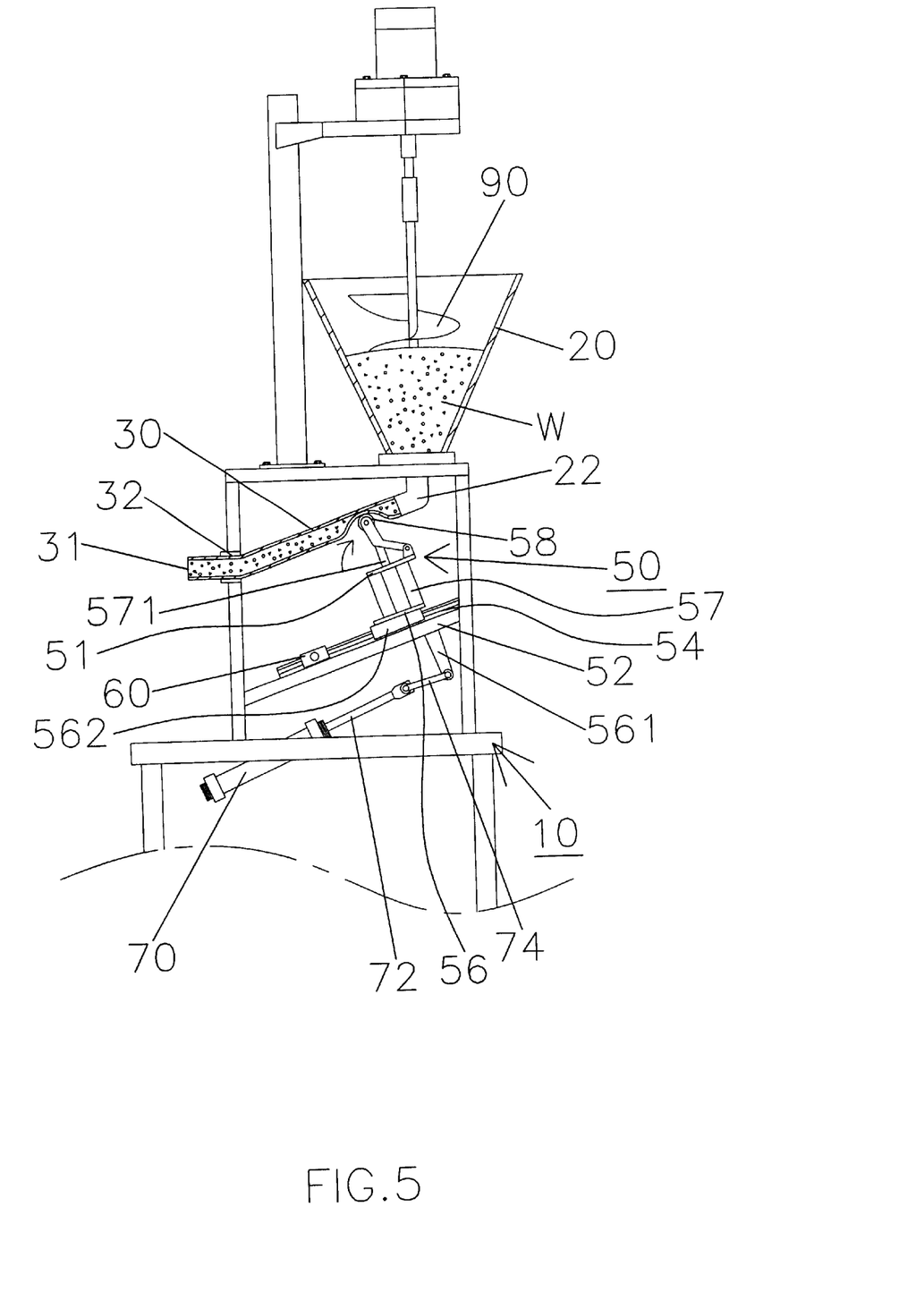
FIG. 5 is an operational view (B) showing the displacement of the pushing device of the present invention.

According to the primary features described above, a lower pneumatic cylinder 70 is mounted on the main frame 10 and is positioned below the transverse seat plate 52. A link 74 is pivotally at the front end of the piston rod 72 of the lower pneumatic cylinder 70. The other end of the link 74 is pivotally on the lower end of a fixing arm 561. The upper end of the fixing arm 561 is secured to the slide seat 56, as shown in FIG. 4.

According to the primary features described above, a slider 562 is further provided on the lower portion of the slide seat 56. The slider 562 is slidably attached onto the slide rail 54.

Figure 3A:
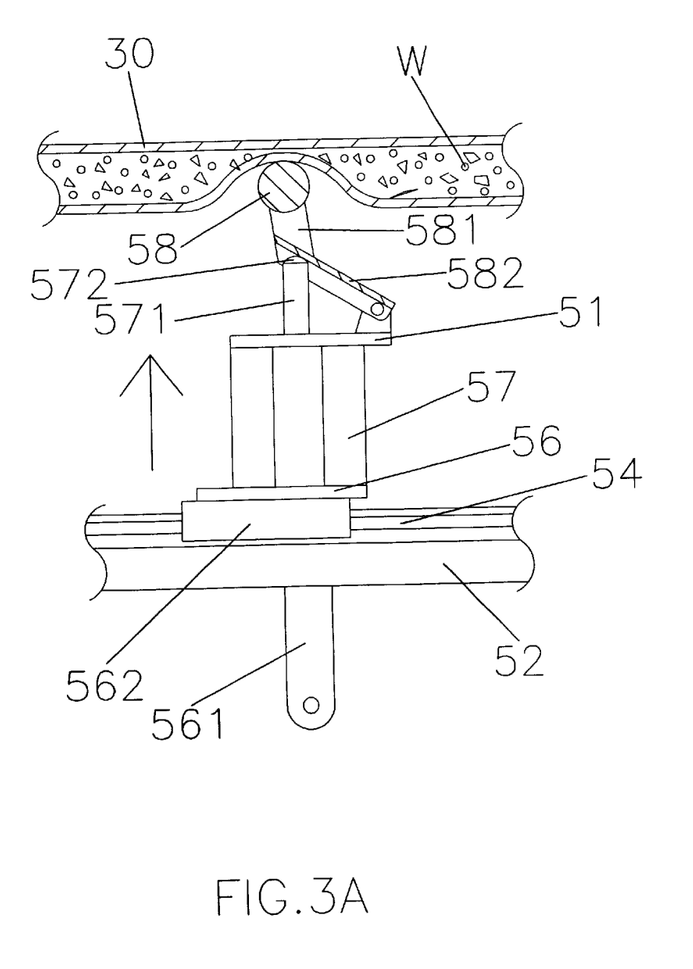
FIG. 3A is a side operational view showing the roller member pressing against the hose.

According to the primary features described above, a top plate 582 is secured between the two side arms 581. The top portion 572 of the piston rod 571 can contact the top plate 582 and bears the top plate 582 upwardly as necessary to make the roller member 58 press against the hose 30 so as to compress and deform the hose 30, as shown in FIG. 3A.

According to the primary features described above, the fixing plate 51 is secured onto the slide seat by means of fixing bolts 511(511).

Figure 3B:
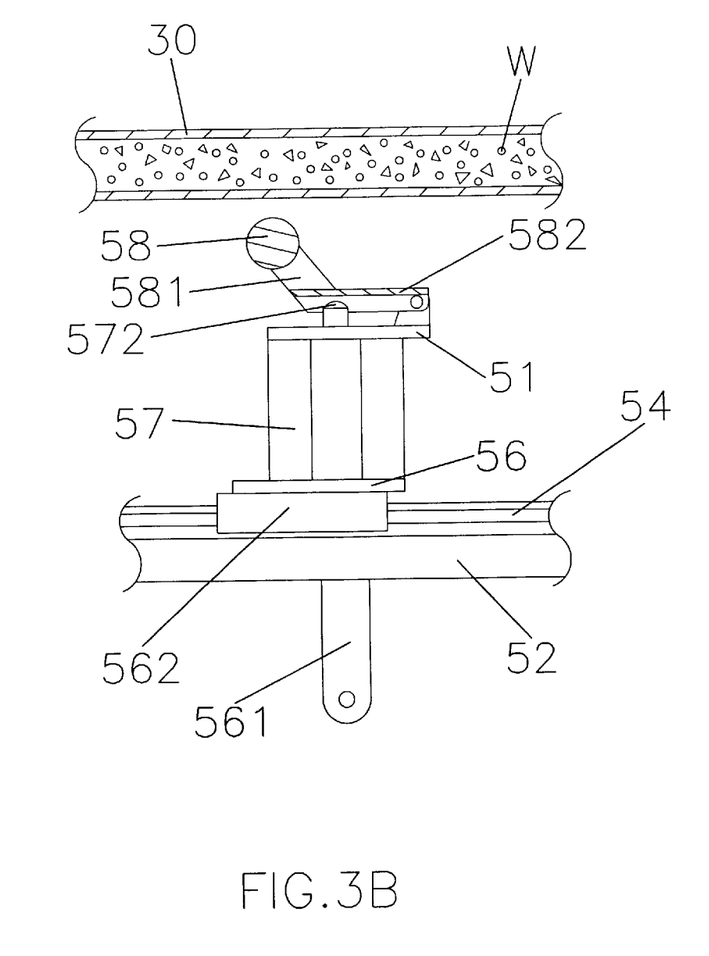
FIG. 3B is a side operational view showing the roller member moving away from the hose.
Figure 6:
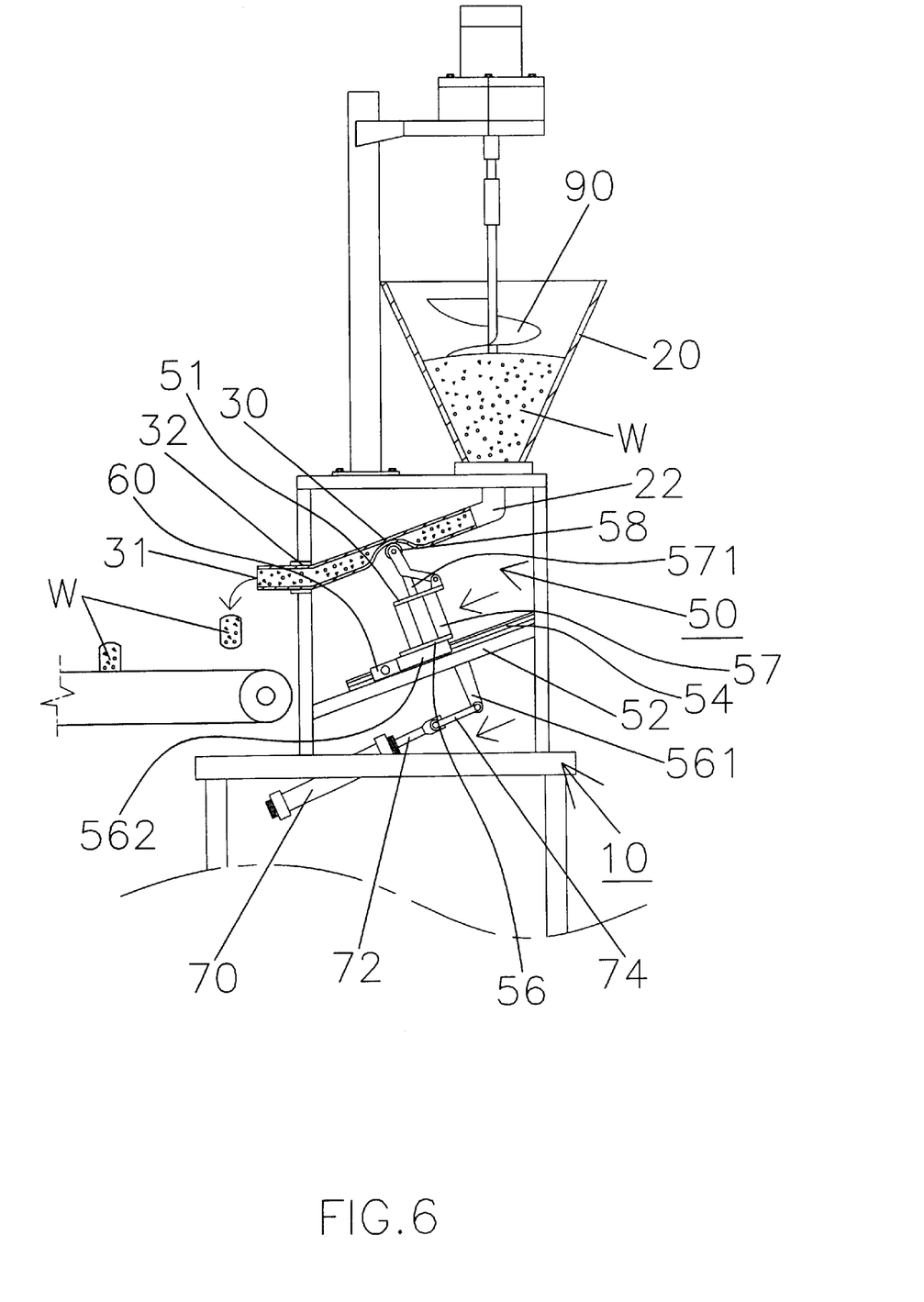
FIG. 6 is an operational view (C) showing the displacement of the pushing device of the present invention.

According to the achievement of the primary and secondary features described above, the practical embodiments of the present invention are as follows:

(1) The stuffing W is stored in the hopper 20 and is stirred by a spiral blade mechanism 90 (this is known in the art and shall not be described further herein). The stuffing W is acted upon by the blade mechanism 90 in a larger container and this is only a preliminary stirring and guiding and basically will not destroy the fibrous tissues of the vegetables in the stuffing. Therefore, at this stage, no large amount of oil and water is produced. The stuffing W is then fed into the hose 30. When the stuffing W is supplied into the hose 30, as shown in FIGS. 3B and 4, the lower pneumatic cylinder 70 is actuated, and the piston rod 72 moves forwardly to the dead end. The link 74 drives the fixing arm 561 to move forwardly to make the slider 562 move rearwardly on the slide rail 54. The slide seat 56 attached to the slider 562, the upper pneumatic cylinder 57, fixing plate 51 and roller member 58 synchronously move with the slider 562 to the rear dead end. At this point, the roller member 58 is located at the dead end. When the roller member 58 is displaced to the rear dead end, the upper pneumatic cylinder 57 is actuated and the piston rod 571 extends upwardly. The top portion 572 of the piston rod 571 pushes upwardly the top plate 582, as shown in FIGS. 1 and 3A, and causes the roller member wheel 58 to roll and press against the hose 30 at a suitable position. The pressed hose 30 thus deforms so that the path for the stuffing in the hose 30 is cut off. Immediately after, the lower pneumatic cylinder 70 is actuated and the piston rod 72 retracts and is restored in position, the pushing device 50 being displaced along to the rear dead end. Thereby, the roller member 58 pushes against the deformed hose 30 and moves rearwardly, so as to squeeze some of the stuffing in the hose 30 out of the hose 30 through the outlet end 31 for filling. It must be mentioned herein that one end of the hose 30 is tightly fixed to the guide pipe 22 at the lower portion of the hopper 20, while the other end is tightly fixed on the main frame 10 at the positioning part 32 thereof Therefore, the hose 30 is effectively mounted in an inclined position. Such inclined positioning allows the lower surface of the hose 30 to be easily compressed when the roller member 58 presses against the hose 30, and the compressed part can be easily deformed. Thus, when the roller member 58 makes squeezing and pushing movement on the hose 30, some of the stuffing W in the hose 30 can be easily squeezed out of the outlet end 31 for the filling operation downstream, as shown in FIG. 6.

(2) The distance-setting block 60 is intended to set the sliding distance of travel of the downward movement of the slider 562 on the slide rail 54 and, relatively, can control the compression of the roller member 58 against the hose 30 and the distance of displacement. The ultimate object is for controlling the amount of stuffing output in the hose 30 each time. In addition, the two ends of the fixing bolts 511(511) are threadedly connected onto the fixing plate 51 and slide seat 56, the purpose of which is to increase the stability of the fixing plate 51. The fixing plate 51 has a through-hole provided thereon (not shown) for the piston rod 571 of the upper pneumatic cylinder 57 to shuttle back and forth out of the fixing plate 51, and further has the effect of ensuring that the top plate 582 is pushed upwardly.

(3) In the embodiment of the present invention, the rapid and convenient downward sliding of the push device 50 further enhances the stuffing W in the hose 30, and the output of the stuffing is smooth and fast.

As to the stuffing W in the hose 30, since the compression and squeezing of the hose 30 by the roller member 58 deforms the hose 30 as to partially cut off the path of the stuffing W, when the roller member 58 and hose 30 make contact and move, the pushing movement is not that of the spiral blades. Thus, destruction of the fibrous tissue in the stuffing W can be prevented and the original appearance of the stuffing in the hopper 20 is maintained, so that the stuffing coming out from the outlet end 31 still retains the original meat or vegetable therein.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A filling mechanism which does not dehydrate or deoil the stuffing, comprising:

a main frame on which is mounted a hopper and a hose, said hopper guiding the stuffing into said hose, said hose having a front end positioning part that is tightly fixed;

a pushing device for guiding and pushing the stuffing, said pushing device being mounted below said hose and including a transverse seat plate on the upper surface of which is disposed a slide rail, a slide seat slidably displaceable along said slide rail, a upper pneumatic cylinder disposed on said slide seat, and a fixing plate mounted on the upper portion of said pneumatic cylinder, said pneumatic cylinder having a piston rod which can shuttle back and forth out of said fixing plate; and a transverse roller member having two side arms by which the roller member is pivotally onto said fixing plate, whereby upon raising said piston rod and displacement of said slide seat, said roller member rolls and presses against said hose, causing said hose to be partially deformed and the stuffing in said hose to be squeezed and displaced out of said hose.

2. A filling mechanism as claimed in claim 1, wherein said slide rail has a rear section provided with a distance-setting block which is slidably attached by a bolt such that said block is adjustably and threadedly fixed on said slide rail to thereby control the distance of travel of said slide seat.

3. A filling mechanism as claimed in claim 1, further comprising a lower pneumatic cylinder mounted on said main frame and is positioned below said transverse seat plate, and wherein a link is pivotally at the front end of said piston rod of said pneumatic cylinder and the other end of said link is pivotally on the lower end of a fixing arm, the upper end of said fixing arm being secured to said slide seat.

4. A filling mechanism as claimed claim 1, wherein a slider is further provided on the lower portion of said slide seat, said slider being slidably attached onto said slide rail.

5. A filling mechanism as claimed in claim 1, wherein a top plate is provided between said two side arms, the top portion of said piston rod contacting said top plate and bearing said top plate upwardly as necessary to enable said roller member to press against said hose so as to compress and deform said hose.

6. A filling mechanism as claimed in claim 1, wherein said fixing plate is secured onto said slide seat by means of fixing bolts.

* * * * *